(12) United States Patent
Qiu et al.

(10) Patent No.: US 12,188,624 B1
(45) Date of Patent: Jan. 7, 2025

(54) HIGH-COLOR-GAMUT QUANTUM DOT LENS AND METHOD FOR MANUFACTURING BACKLIGHT MODULE

(71) Applicant: Nantong Veeyee New Material Technology Co., Ltd, Rugao (CN)

(72) Inventors: Xiaohua Qiu, Rugao (CN); Chong Wan, Rugao (CN); Haiyan Wei, Rugao (CN); Tianheng Qiu, Rugao (CN)

(73) Assignee: Nantong Veeyee New Material Technology Co., Ltd, Rugao (CN)

( * ) Notice: Subject to any disclaimer, the term of this patent is extended or adjusted under 35 U.S.C. 154(b) by 0 days.

(21) Appl. No.: 18/761,366

(22) Filed: Jul. 2, 2024

(30) Foreign Application Priority Data

Jul. 6, 2023 (CN) .......................... 202310821167.3

(51) Int. Cl.
*F21K 9/64* (2016.01)
*F21K 9/69* (2016.01)
*G02B 1/00* (2006.01)
*G02B 19/00* (2006.01)

(52) U.S. Cl.
CPC ............... *F21K 9/64* (2016.08); *F21K 9/69* (2016.08); *G02B 1/00* (2013.01); *G02B 19/0061* (2013.01)

(58) Field of Classification Search
CPC .... F21K 9/64; F21K 9/69; G02B 1/00; G02B 19/0061
See application file for complete search history.

(56) References Cited

U.S. PATENT DOCUMENTS

2015/0159833 A1* 6/2015 Qiu .......................... F21V 5/04
362/335

FOREIGN PATENT DOCUMENTS

| CN | 105423161 A | 3/2016 |
|---|---|---|
| CN | 106558576 A | 4/2017 |
| CN | 106992241 A | 7/2017 |
| CN | 107246563 A | 10/2017 |
| CN | 107728376 A | 2/2018 |
| CN | 107946433 A | 4/2018 |

(Continued)

OTHER PUBLICATIONS

Park et al., CN 102237351, Nov. 2011 (Year: 2011).*
Qui et al., CN 112083520, Dec. 2020 (Year: 2020).*
Elibol et al., EP 3418041, Dec. 2018 (Year: 2018).*

*Primary Examiner* — Mary Ellen Bowman
(74) *Attorney, Agent, or Firm* — Bayramoglu Law Offices LLC

(57) ABSTRACT

A high-color-gamut quantum dot lens and a method for manufacturing a backlight module are provided. The method includes: mixing quantum dots with an acrylic resin, carrying out mixing granulation on the quantum dots and the acrylic resin by using an internal mixer to obtain quantum dot acrylic particles, carrying out injection molding on an acrylic material containing quantum dots to obtain a quantum dot lens, and then spraying a water and oxygen resistant transparent material on the surface of the injection-molded quantum dot lens for encapsulation. Light emitted from a white LED chip irradiates onto the quantum dot lens, and an RGB independent spectrum is superposed on a common fluorescent powder spectrum by means of a quantum dot light conversion material; and the superposed spectrum obtained thereby passes through an LCD screen, and a color display screen with a high color saturation and a wide color gamut will be obtained.

12 Claims, 3 Drawing Sheets

(56) References Cited

FOREIGN PATENT DOCUMENTS

| | | |
|---|---|---|
| CN | 115657169 A | 1/2023 |
| KR | 20180083776 A | 7/2018 |

\* cited by examiner

HIGH-COLOR-GAMUT QUANTUM DOT LENS AND METHOD FOR MANUFACTURING BACKLIGHT MODULE

CROSS-REFERENCE TO THE RELATED APPLICATIONS

This application is based upon and claims priority to Chinese Patent Application No. 202310821167.3, filed on Jul. 6, 2023, the entire contents of which are incorporated herein by reference.

TECHNICAL FIELD

The present invention relates to the technical field of liquid crystal display, and more specifically to a high-color-gamut quantum dot lens and a method for manufacturing a backlight module.

BACKGROUND

With the development of consumer electronics, liquid crystal display (LCD) technologies have been widely used in various fields because of various advantages such as thin body, wide viewing angle, low cost, energy conservation and environmental protection.

An LCD panel is composed of a backlight module and a front liquid crystal panel, and a light-emitting unit in the backlight module is generally provided by an LED light source. An LED chip is composed of a blue light chip and fluorescent powder. Due to the characteristics of the fluorescent powder, a white light spectrum obtained by exciting the fluorescent powder with blue light is a continuous spectrum, and the wavelength is generally from 400-700 nm. Due to the characteristics of the continuous spectrum of the backlight module, when light passes through a CF and a polarizer of the LCD panel, the color gamut of the LCD panel is approximately 65-74%@NTSC 1931. In the era of rapid development of display technologies, higher requirements are imposed on high dynamic, high resolution, and high color gamut while cost reduction is also a goal of manufacturers.

With the continuous maturity and development of quantum dot technologies, more and more quantum dot technologies are applied to LCD backlight modules. Currently, the most widely used quantum dot technology is to replace a lower diffuser film with a quantum dot film having a sandwich structure in a backlight module, and then replace a white LED chip with a blue LED chip. The blue LED chip excites a photoluminescent material in the quantum dot film to obtain a white light source of an RGB three-color discontinuous spectrum. After RGB white light passes through a CF and a polarizer of an LCD panel, the performance of a color gamut of an LCD screen is approximately 100-120%@NTSC 1931, thereby greatly improving the color performance of LCD.

With the wide application of the quantum dot technology, the cost control pressure is increasing. Since a large amount of high-cost quantum dot materials are used for the quantum dot film, the cost of a display backlight module is still high. In addition, the perception of the color gamut covering over 100% NTSC 1931 to human eyes has reached a boundary which is hard to distinguish, and the color gamut covering about 90% NTSC 1931 can better meet the requirements of human eyes, and can greatly reduce the cost of the whole backlight module.

In a conventional LCD white backlight module, a light source consists of a blue LED, a fluorescent powder, and a common transparent reflective (or refractive) type lens. Due to physicochemical properties of the quantum dot materials, quantum dots cannot survive in nature. The quantum dots need to be encapsulated in a water-free and oxygen-free environment, and the materials are extremely sensitive to high temperatures and strong blue light; therefore, the quantum dot materials cannot be encapsulated on the surface of LED chips like the fluorescent powder. A high-color temperature white LED light source is used to excite the quantum dot reflective (or refraction) type lens, so that a superposition state of a white light continuous spectrum and a quantum dot RGB discontinuous spectrum can be obtained. The backlight module can greatly reduce production and manufacturing costs while improving the whole LCD color display color gamut.

In summary, the quantum dot film technology used for the backlight module to improve the color gamut in an existing LCD technology has problems of high cost and low light conversion efficiency, so a panel has low light extraction efficiency and low light emergent rate, and a display panel has an undesirable display effect and cost, Meanwhile, a mechanism for improving the light conversion efficiency has a complicated production process. For this reason, the technology of exciting a low-density quantum dot lens by white light is desired, and how to solve the above disadvantages in the prior art is an urgent technical problem to be solved by those skilled in the art.

SUMMARY

In view of the above, the present invention provides a high-color-gamut quantum dot lens and a method for manufacturing a backlight module, which are compatible with existing backlight module solutions. On the premise of not changing the production process flow of the backlight module, a conventional white light lens is replaced with a quantum dot lens, improving the light conversion efficiency of quantum dots, and at the same time, improving luminous spectra of a conventional backlight module, thereby improving the color gamut performance of a liquid crystal display (LCD) screen, realizing uniform illumination and improving the brightness.

In order to achieve the above goal, the present invention provides the following technical solutions:

A high-color-gamut quantum dot lens, comprising a quantum dot lens body, the quantum dot lens body is made of a transparent acrylic material or a transparent resin without diffusion particles, the acrylic material contains a quantum dot light conversion material, and an outer surface of the quantum dot lens body is sprayed with a water and oxygen resistant transparent coating.

Optionally, a light emergent surface is provided on the quantum dot lens body; a diffuse reflection surface and a circular cavity with a downward opening are provided on a bottom surface of the quantum dot lens body; an inner wall of the circular cavity is an arc-shaped surface as a light incident surface; an edge of the light emergent surface and an edge of the diffuse reflection surface are connected via a vertical wall surface.

Optionally, the total thickness of the quantum dot lens body is within 4-7 mm, and the height of the vertical wall surface is within 2-3 mm.

Optionally, the light emergent surface is an arc surface or an elliptic surface, and a concave surface structure is provided in the middle of the arc surface or the elliptic surface.

The depth of the concave surface structure is within 0.4-0.8 mm, and the height of the circular cavity is within 3-4 mm.

Optionally, locating columns are provided on the bottom surface of the quantum dot lens body and located around the circular cavity.

Optionally, the number of the locating columns is three or more, and the locating columns are arranged in central symmetry.

Optionally, the vertical wall surface is provided with a plurality of arc-shaped convex surfaces.

Optionally, the high-color-gamut quantum dot lens further comprises an LED bead mounted at the opening of the circular cavity and a circuit board mounted under the LED bead, wherein the opening of the circular cavity serves as a mounting port of the LED bead.

A method for manufacturing a backlight module comprises the following steps:

mixing a quantum dot concentrated solution or quantum dots powder with an acrylic resin, and making acrylic particles containing a quantum dot conversion material through a granulator;

carrying out optical designing and optical path simulation on a quantum dot lens by optical software to obtain an optimal light diffusion angle and uniformity of light spots;

manufacturing an optical mold by using 3-axis/4-axis/5-axis machining centers according to the optimal light diffusion angle and the uniformity of the light spots, and designing an extrusion runner according to a processing scheme of an injection molding machine;

carrying out injection molding on the manufactured optical mold through the injection molding machine, and obtaining a quantum dot lens with special optical performance by controlling temperatures of different areas and material injection pressure of the optical mold; and spraying a layer of water and oxygen resistant transparent material on the surface of the obtained quantum dot lens, drying the material by thermocuring or photocuring and obtaining the quantum dot lens with a water and oxygen resistant layer.

Optionally, the net content of quantum dots in the acrylic particles containing the quantum dot conversion material accounts for 5-5000 ppm.

It can be seen from the above technical solutions that, compared with the prior art, the present invention provides a high-color-gamut quantum dot lens and a method for manufacturing a backlight module. The method comprises: mixing quantum dots with an acrylic resin, carrying out mixing granulation on the quantum dots and the acrylic resin by using an internal mixer to obtain quantum dot acrylic particles, carrying out injection molding on an acrylic material containing quantum dots to obtain a quantum dot lens, and then spraying a water and oxygen resistant transparent material on the surface of the injection-molded quantum dot lens for encapsulation. Light emitted from a white LED chip irradiates onto the quantum dot lens, and an RGB independent spectrum is superposed on a common fluorescent powder spectrum by means of a quantum dot light conversion material, thereby improving a spectrum curve of the whole backlight module; and the superposed spectrum obtained thereby passes through an LCD screen, and a color display screen with a high color saturation and a wide color gamut will be obtained. The present invention can greatly reduce manufacturing costs of quantum dot backlight modules produced by a quantum dot film or quantum dot diffusion plate process without changing the process flow of the backlight module.

BRIEF DESCRIPTION OF THE DRAWINGS

In order to explain the embodiments of the present invention or the technical solutions in the prior art more clearly, the accompanying drawings required by the embodiments of the present invention or description in the prior art are introduced briefly below. Apparently, the accompanying drawings in the description below are merely embodiments of the present invention, and those of ordinary skill in the art can also obtain other accompanying drawings based on the provided accompanying drawings without paying creative work.

Reference signs: 1—quantum dot lens body (acrylic resin), 2—outer optical surface (light emergent surface) of the quantum dot lens, 3—inner optical surface (light incident surface) of the quantum dot lens, 4—quantum dot lens bottom reflective micro-prism optical structure, 5—vertical light emergent surface on the circumferential side surface of the quantum dot lens, 6—quantum dot lens inhibition center optical structure with a high light emergent rate, 7—quantum dot lens connecting leg, 8—quantum dot lens side edge, 9—LED bead, 10—circuit board, 31—incidence light surface, 32—LED chip.

DETAILED DESCRIPTION OF THE EMBODIMENTS

The technical solutions in the embodiments of the present invention will be clearly and completely described below in conjunction with the accompanying drawings in the embodiments of the present invention. Obviously, the described embodiments are only a part of the embodiments of the present invention, but not all of the embodiments. Based on the embodiments of the present invention, all other embodiments obtained by those skilled in the art without creative efforts fall within the scope of protection of the present invention.

In view of the problems existing in the prior art, the present invention provides a solution compatible with an existing backlight module. On the premise of not changing the production process flow of the backlight module, a white light lens is replaced with a quantum dot lens, improving the light conversion efficiency of quantum dots and luminous spectra of a conventional backlight module, thereby improving the color gamut performance of a liquid crystal display (LCD) screen, realizing uniform illumination and improving the brightness.

Figure 1:
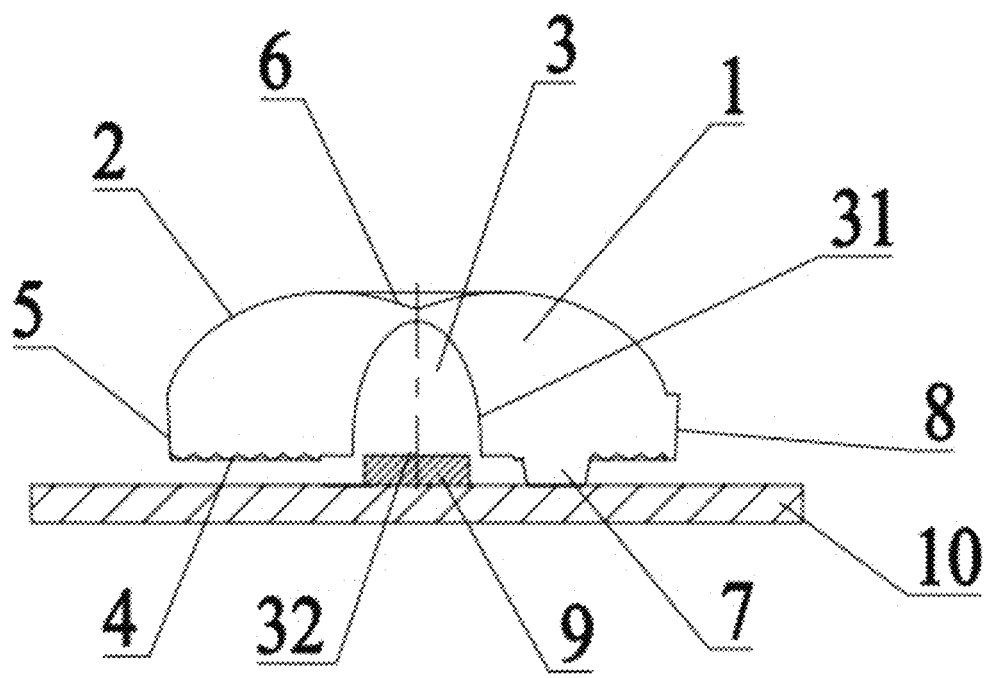
FIG. 1 is a structural diagram of a refractive quantum dot lens according to the present invention.
Figure 2:
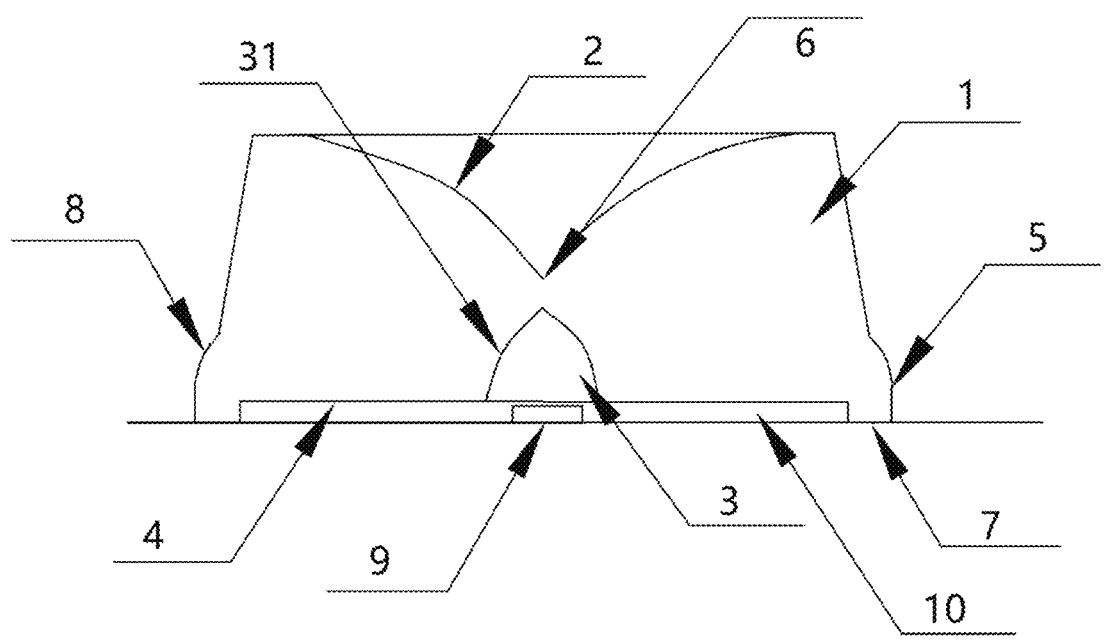
FIG. 2 is a structural diagram of a reflective quantum dot lens according to the present invention.

Specifically, the embodiment of the present invention discloses a high-color-gamut quantum dot lens, as shown in FIGS. 1-2, including a quantum dot lens body 1, the quantum dot lens body 1 is made of a transparent acrylic material or a transparent resin without diffusion particles, the acrylic material contains a quantum dot light conversion material, an outer surface of the quantum dot lens body 1 is sprayed with a water and oxygen resistant transparent coating, and the coating can effectively protect a quantum dot material against damage of water and oxygen in the air.

A conventional lens does not contain the quantum dot material without considering the problem of water and oxygen resistance. The quantum dot lens is made of an acrylic material added with a quantum dot ingredient. Because of the sensitivity of the quantum dot material to water and oxygen, a water and oxygen resistant transparent layer needs to be designed on the surface of the lens to prevent external water and oxygen from damaging the quantum dot material.

Further, a light emergent surface 2 is provided on the quantum dot lens body 1, a diffuse reflection surface (namely a quantum dot lens bottom reflective micro-prism optical structure 4, also called a pyramid reflecting surface) and a circular cavity with a downward opening are provided on a bottom surface of the quantum dot lens body 1, an inner wall of the circular cavity is an arc-shaped surface as a light incident surface 3, and an edge of the light emergent surface 2 and an edge of the diffuse reflection surface are connected via a vertical wall surface (namely a vertical light emergent surface 5 on the circumferential side surface of the quantum dot lens).

Further, the total thickness of the quantum dot lens body 1 is within 4-7 mm, and the height of the vertical wall surface is within 2-3 mm.

Furthermore, the light emergent surface 2 is an arc surface or an elliptic surface, and a concave surface structure (namely a quantum dot lens inhibition center optical structure 6 with a high light emergent rate) is provided in the middle of the arc surface or the elliptic surface, the depth of the concave surface structure is within 0.4-0.8 mm, and the height of the circular cavity is within 3-4 mm.

Furthermore, locating columns are provided on the bottom surface of the quantum dot lens body 1 and located around the circular cavity.

Specifically, the number of the locating columns is three or more, and the locating columns are arranged in central symmetry.

Furthermore, the vertical wall surface is provided with a plurality of arc-shaped convex surfaces.

Further, the high-color-gamut quantum dot lens includes an LED bead 9 mounted at the opening of the circular cavity and a circuit board 10 mounted under LED bead 9, wherein the opening of the circular cavity serves as a mounting port of the LED bead 9. In addition, the quantum dot lens body 1 is in contact with the circuit board 10 through a quantum dot lens connecting leg 7, a quantum dot lens side edge 8 is an independent vertical surface, 31 represents an incidence light surface, and 32 represents an LED chip.

Figure 3:
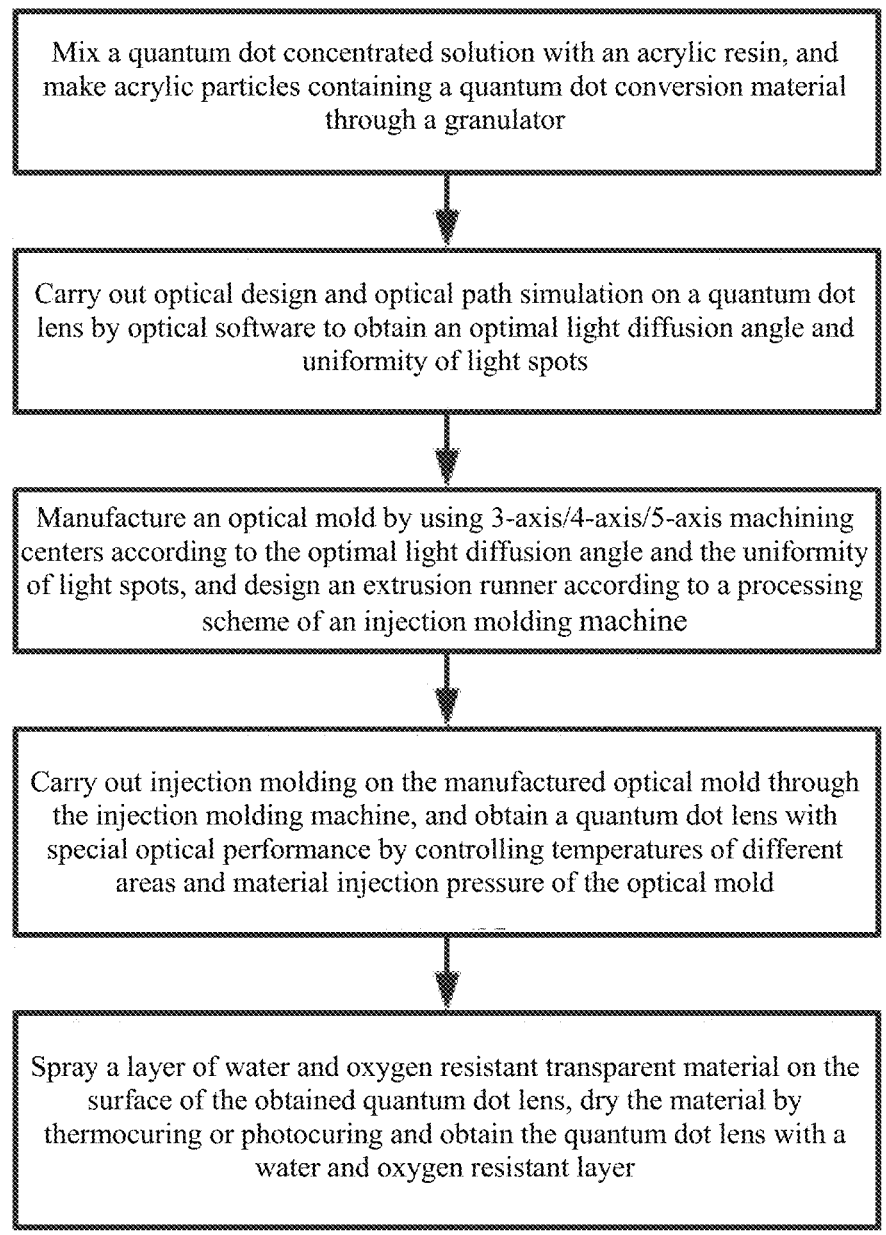
FIG. 3 is a flow chart of a method for preparing a backlight module according to the present invention.

In addition, the embodiment further provides a method for manufacturing a backlight module, as shown in FIG. 3, including the following steps:

mixing a quantum dot concentrated solution with an acrylic resin (PMMA), and making acrylic particles containing a quantum dot conversion material through a granulator;

carrying out optical designing and optical path simulation on a quantum dot lens by optical software (such as lighttools) to obtain an optimal light diffusion angle and uniformity of light spots;

manufacturing an optical mold by using 3-axis/4-axis/5-axis machining centers according to the optimal light diffusion angle and the uniformity of the light spots, and designing an extrusion runner according to a processing scheme of an injection molding machine;

carrying out injection molding on the manufactured optical mold through the injection molding machine, and obtaining a quantum dot lens with special optical performance by controlling temperatures of different areas and material injection pressure of the optical mold; and spraying a layer of water and oxygen resistant transparent material on the surface of the obtained quantum dot lens, drying the material by thermocuring or photocuring and obtaining the quantum dot lens with a water and oxygen resistant layer and with good performance.

Further, the net content of quantum dots in the acrylic particles containing the quantum dot conversion material accounts for 5-5000 ppm.

In the embodiment, the acrylic resin (PMMA) mixed with the quantum dot material is poured into the injection molding machine without being mixed with an acrylic pure material in a ratio; only an acrylic material containing a quantum dot material in a mixing machine is used; and a quantum dot lens with excellent uniformity and consistency is obtained by means of injection molding using this solution. Since the acrylic resin containing the quantum dot material does not contain diffusion particles, the direction of light follows the principle of light refraction and reflection.

A light source part in a conventional direct type backlight module includes an LED chip and a white light lens, and the white light lens is divided into a reflective lens and a refractive lens. The quantum dot lens is formed by injection molding using the acrylic resin (PMMA) mixed with the quantum dot material, and the quantum dot light conversion material in the lens is excited by white light or blue light, so as to obtain white light with a special RGB spectrum. A transparent quantum dot lens is used to excite quantum dots with blue light (or white light) to obtain RGB, and the light-emitting angle thereof complies with the principle of light refraction and reflection and does not need secondary light distribution; therefore, the production process and the difficulty of optical design are reduced, and white light with a large angle, high brightness, good uniformity and high color gamut can be produced.

Based on the above solutions, the present embodiment provides a method for forming a low-density quantum dot lens in a backlight module of an LCD, which includes: mixing a quantum dot light conversion material and a traditional PMMA material, performing injection molding to obtain a white-light excited quantum dot lens, then performing water-proof and oxygen-proof encapsulation on the surface of the quantum dot lens, and finally obtaining the backlight module with a high color displaying effect, thereby not only improving the light conversion efficiency of quantum dots, but also greatly reducing the production and manufacturing costs.

The embodiments in this description are described in a progressive manner, each embodiment focuses on a difference from other embodiments, and reference may be made to each other for the same or similar parts of the embodiments. Since the method disclosed in the embodiments corresponds to the system disclosed in the embodiments, the description thereof is relatively simple, and the relevant parts can refer to the description of the method.

The foregoing descriptions of the disclosed embodiments enable persons skilled in the art to implement or use the present invention. Various modifications to the embodiments will be readily apparent to those skilled in the art, and the generic principles defined herein may be implemented in other embodiments without departing from the spirit or scope of the present invention. Therefore, the present invention will not be limited to the embodiments described herein but be in accordance with the widest scope consistent with the principles and novel features disclosed herein.

What is claimed is:

1. A high-color-gamut quantum dot lens, comprising a quantum dot lens body, wherein the quantum dot lens body is made of a transparent acrylic material or a transparent resin without diffusion particles, the transparent acrylic material contains a quantum dot light conversion material, and an outer surface of the quantum dot lens body is sprayed with a water and oxygen resistant transparent coating;

a light emergent surface is provided on the quantum dot lens body; a diffuse reflection surface and a circular cavity with a downward opening are provided on a bottom surface of the quantum dot lens body; an inner wall of the circular cavity is an arc-shaped surface as a light incident surface; an edge of the light emergent surface and an edge of the diffuse reflection surface are connected via a vertical wall surface;

the vertical wall surface is provided with a plurality of arc-shaped convex surfaces;

the diffuse reflection surface is a reflective micro-prism optical structure; and the light emergent surface is an arc surface or an elliptic surface, and a concave surface structure is provided in a middle of the arc surface or the elliptic surface.

2. The high-color-gamut quantum dot lens according to claim 1, wherein a total thickness of the quantum dot lens body is within 4-7 mm, and a height of the vertical wall surface is within 2-3 mm.

3. The high-color-gamut quantum dot lens according to claim 1, wherein a depth of the concave surface structure is within 0.4-0.8 mm, and a height of the circular cavity is within 3-4 mm.

4. The high-color-gamut quantum dot lens according to claim 1, wherein locating columns are provided on the bottom surface of the quantum dot lens body and located around the circular cavity.

5. The high-color-gamut quantum dot lens according to claim 4, wherein a number of the locating columns is at least three, and the locating columns are arranged in central symmetry.

6. The high-color-gamut quantum dot lens according to claim 1, further comprising an LED bead mounted at the downward opening of the circular cavity and a circuit board mounted under the LED bead, wherein the downward opening of the circular cavity serves as a mounting port of the LED bead.

7. A method for manufacturing a backlight module, comprising the following steps:

mixing a quantum dot concentrated solution with an acrylic resin, and making acrylic particles containing a quantum dot conversion material through a granulator;

carrying out optical designing and optical path simulation on a quantum dot lens by optical software to obtain an optimal light diffusion angle and uniformity of light spots;

manufacturing an optical mold by using 3-axis/4-axis/5-axis machining centers according to the optimal light diffusion angle and the uniformity of the light spots, and designing an extrusion runner according to a processing scheme of an injection molding machine;

carrying out injection molding on the optical mold through the injection molding machine, and obtaining a quantum dot lens with special optical performance by controlling temperatures of different areas and material injection pressure of the optical mold; and spraying a layer of water and oxygen resistant transparent material on a surface of the quantum dot lens with the special optical performance, drying the layer of water and oxygen resistant transparent material by thermo-curing or photocuring and obtaining a quantum dot lens with a water and oxygen resistant layer.

8. The method for manufacturing the backlight module according to claim 7, wherein a net content of quantum dots in the acrylic particles containing the quantum dot conversion material accounts for 10-5000 ppm.

9. The high-color-gamut quantum dot lens according to claim 2, further comprising an LED bead mounted at the downward opening of the circular cavity and a circuit board mounted under the LED bead, wherein the downward opening of the circular cavity serves as a mounting port of the LED bead.

10. The high-color-gamut quantum dot lens according to claim 3, further comprising an LED bead mounted at the downward opening of the circular cavity and a circuit board mounted under the LED bead, wherein the downward opening of the circular cavity serves as a mounting port of the LED bead.

11. The high-color-gamut quantum dot lens according to claim 4, further comprising an LED bead mounted at the downward opening of the circular cavity and a circuit board mounted under the LED bead, wherein the downward opening of the circular cavity serves as a mounting port of the LED bead.

12. The high-color-gamut quantum dot lens according to claim 5, further comprising an LED bead mounted at the downward opening of the circular cavity and a circuit board mounted under the LED bead, wherein the downward opening of the circular cavity serves as a mounting port of the LED bead.

* * * * *